(12) United States Patent
Abe

(10) Patent No.: US 11,342,614 B2
(45) Date of Patent: May 24, 2022

(54) BATTERY CELL AND BATTERY PACK USING SAME

(71) Applicant: Panasonic Intellectual Property Management Co., Ltd., Osaka (JP)

(72) Inventor: Yuuichi Abe, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 16/633,575

(22) PCT Filed: Sep. 3, 2018

(86) PCT No.: PCT/JP2018/032521
§ 371 (c)(1),
(2) Date: Jan. 23, 2020

(87) PCT Pub. No.: WO2019/082509
PCT Pub. Date: May 2, 2019

(65) Prior Publication Data
US 2020/0161600 A1 May 21, 2020

(30) Foreign Application Priority Data

Oct. 24, 2017 (JP) .............................. JP2017-204864

(51) Int. Cl.
*H01M 50/124* (2021.01)
*H01M 10/658* (2014.01)
*H01M 50/116* (2021.01)

(52) U.S. Cl.
CPC ....... *H01M 50/124* (2021.01); *H01M 10/658* (2015.04); *H01M 50/116* (2021.01)

(58) Field of Classification Search
None
See application file for complete search history.

(56) References Cited

U.S. PATENT DOCUMENTS

| | | | |
|---|---|---|---|
| 2012/0164504 A1* | 6/2012 | Takashina | ................ B60K 6/48 429/99 |
| 2017/0197378 A1 | 7/2017 | Abe et al. | |
| 2019/0006642 A1* | 1/2019 | Sakaguchi | .......... H01M 10/653 |

(Continued)

FOREIGN PATENT DOCUMENTS

| | | |
|---|---|---|
| CN | 106660317 A | 5/2017 |
| CN | 109643778 A | 4/2019 |
| JP | 2003-346754 | 12/2003 |

(Continued)

OTHER PUBLICATIONS

International Search Report of PCT application No. PCT/JP2018/032521 dated Dec. 4, 2018.

(Continued)

*Primary Examiner* — Lisa S Park
(74) *Attorney, Agent, or Firm* — McDermott Will & Emery LLP

(57) ABSTRACT

A battery cell includes an exterior can, an electrode body accommodated in the exterior can, a heat insulator disposed on at least a part of the outer surface of the side wall of the exterior can, and an insulative film covering the heat insulator and an entire of the outer surface of the side wall of the exterior can.

14 Claims, 4 Drawing Sheets

(56) References Cited

U.S. PATENT DOCUMENTS

2019/0190098 A1\* 6/2019 Abe .................. D06M 11/79
2020/0058912 A1 2/2020 Kuramitsu et al.

FOREIGN PATENT DOCUMENTS

| JP | 2015-60759 | \* | 3/2015 |
| JP | 2015-060759 | | 3/2015 |
| WO | WO2016/092839 | \* | 6/2016 |
| WO | 2016/199563 | | 12/2016 |
| WO | 2017/159527 | | 9/2017 |
| WO | WO2017/159527 | \* | 9/2017 |
| WO | 2018/061894 | | 4/2018 |
| WO | WO2018/110055 | \* | 6/2018 |

OTHER PUBLICATIONS

English Translation of Chinese Office Action dated Jan. 26, 2022 for the related Chinese Patent Application No. 201880055148.1.

\* cited by examiner

BATTERY CELL AND BATTERY PACK USING SAME

This application is a U.S. National stage application of PCT international application No. PCT/JP2018/032521 filed on Sep. 3, 2018, which claims the benefit of foreign priority of Japanese patent application No. 2017-204864 filed on Oct. 24, 2017, the contents of all of which are incorporated herein by reference.

TECHNICAL FIELD

The present invention relates to a battery cell used for an electric vehicle or the like, and a battery pack including the battery cell.

BACKGROUND ART

Recently, the number of electric vehicles and hybrid vehicles that employ electric motors as main drive sources and auxiliary drive sources for travel has increased. Secondary batteries used for these vehicles are required to support a large current. Therefore, a battery pack produced by combining plural battery cells is used. In order to insulate the battery cells from each other, each battery cell is covered with an insulative sheet, and is fixed in a casing. In order to support the increase in power, measures against heat are demanded.

As a prior art document information related to the invention of this application, Japanese Patent Laid-Open Publication No. 2003-346754 is known, for example.

BRIEF SUMMARY

A battery cell includes an exterior can, an electrode body accommodated in the exterior can, a heat insulator disposed on at least a part of the outer surface of the side wall of the exterior can, and an insulative film covering the heat insulator and an entire of the outer surface of the side wall of the exterior can.

DETAILED DESCRIPTION

Figure 1A:
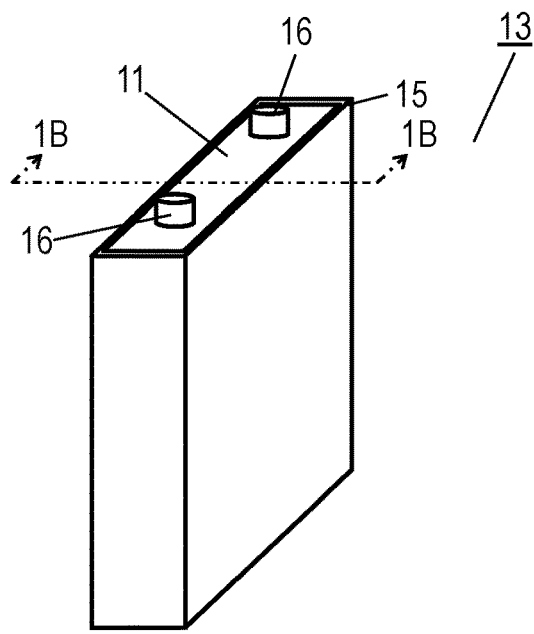
FIG. 1A is a perspective view of a battery cell in accordance with an exemplary embodiment.
Figure 1B:
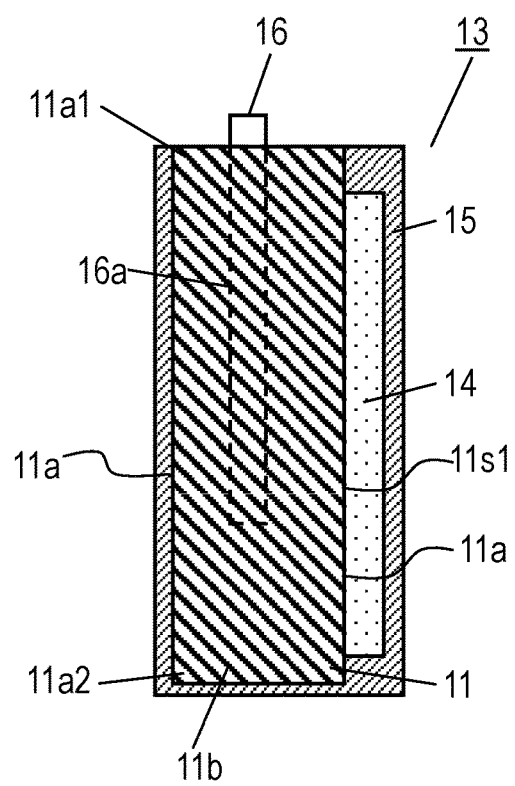
FIG. 1B is a sectional view of the battery cell along line 1B-1B shown in FIG. 1A.

FIG. 1A is a perspective view of battery cell 13 in accordance with an exemplary embodiment. FIG. 1B is a sectional view of battery cell 13 along line 1B-1B shown in FIG. 1A. Battery cell 13 includes exterior can 11, electrode body 16a accommodated in exterior can 11, and terminal electrodes 16 projecting from the top of exterior can 11 in the same direction. Exterior can 11 is made of metal, such as aluminum. Exterior can 11 includes tubular side wall 11a having both ends 11a1 and 11a2 and bottom 11b for sealing end 11a2 of side wall 11a. Side wall 11a is flat. Electrode body 16a is accommodated in exterior can 11 together with non-aqueous electrolyte solution. Terminal electrodes 16 are connected to electrode body 16a, and serve as positive and negative electrodes. Heat insulator 14 is disposed on part 11s1 of outer surface 11s of side wall 11a of exterior can 11. Heat insulator 14 and the entire of outer surface 11s of side wall 11a of exterior can 11 are covered with insulative film 15. In accordance with the embodiment, the entire of bottom 11b of exterior can 11 and outer surface 11s of side wall 11a of exterior can 11 are covered with insulative film 15.

Figure 1C:
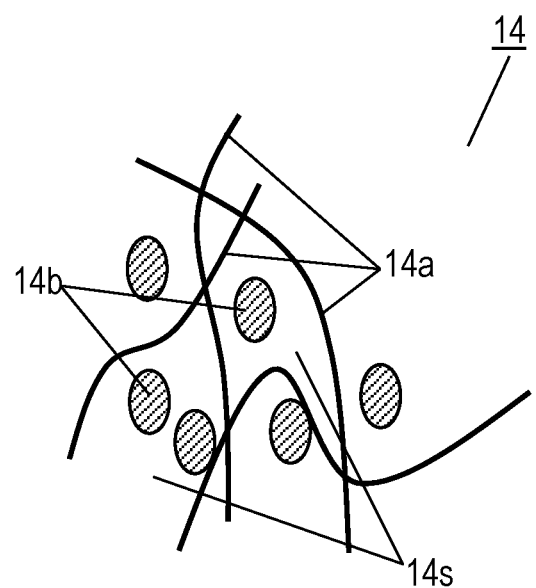
FIG. 1C is an enlarged view of a heat insulator of the battery cell in accordance with the embodiment.

FIG. 1C is an enlarged view of heat insulator 14. Heat insulator 14 has a thickness of about 0.5 mm, and substantially covers exterior can 11 within the range from bottom 11b of outer surface 11s of side wall 11a of exterior can 11 to the opposite end to bottom 11b. Heat insulator 14 includes non-woven fabric 14a as a fiber sheet having spaces 14s therein and silica xerogel 14b held in spaces 14s in non-woven fabric 14a. In accordance with the embodiment, non-woven fabric 14a is made of polyethylene terephthalate (hereinafter referred to as "PET"). Silica xerogel 14b has a porous structure with nano-sized voids for regulating the motion of air molecules, and the thermal conductivity of heat insulator 14 ranges from 0.018 W/mK to 0.024 W/mK. The thermal conductivity of heat insulator 14 is much lower than that of insulative film 15. Silica xerogel 14b is broadly-interpreted xerogel in which gel is in the dry state, and may be a gel obtained not only by a normal drying method, but also by a supercritical drying method or a freeze-drying method. Thus, a sufficient thermal insulation property can be obtained even when heat insulator 14 is thin, by using heat insulator 14 in which silica xerogel 14b is held in spaces 14s in non-woven fabric 14a (fiber sheet). In other words, heat insulator 14 is made of a fiber sheet impregnated with silica xerogel 14b.

Non-woven fabric 14a of heat insulator 14 may be made of another fiber, such as organic fiber, glass fiber, ceramic fiber, oxidized fiber, or carbon fiber. Alternatively, the non-woven fabric may be made of, e.g. a mixture of a thermoplastic resin fiber and one of these fibers. This provides heat insulator 14 with a high heat resistance and a high flame retardance.

While heat insulator 14 is disposed on part 11s1 of outer surface 11s of side wall 11a of exterior can 11, the entire of outer surface 11s of exterior can 11 and heat insulator 14 are covered with insulative film 15. Insulative film 15 is preferably made of a heat shrinkable material having a bag shape. Exterior can 11 including heat insulator 14 is put into the heat shrinkable material, and then exterior can 11 is heated and shrunk. Thereby, the entire of outer surface 11s of side wall 11a of exterior can 11 and heat insulator 14 are covered with insulative film 15, and heat insulator 14 is fixed. Exterior can 11 is put into the heat shrinkable material. Before exterior can 11 is put into the heat shrinkable material, heat insulator 14 is adhered onto part 11s1 of outer surface 11s of exterior can 11. When heat insulator 14 is previously adhered onto part 11s1 of outer surface 11s of exterior can 11, however, heat insulator 14 may be pressed on exterior can 11 by shrinking the heat shrinkable material. Therefore, heat insulator 14 may be adhered onto part 11s1 of outer surface 11s of exterior can 11 with a strength corresponding to a temporary fixation.

A method of manufacturing heat insulator 14 will be described. Non-woven fabric 14a is immersed in a sol that has been produced by, e.g. adding hydrochloric acid to a sodium silicate aqueous solution, thereby causing spaces 14s in non-woven fabric 14a to be impregnated with the sol. This sol is gelated, hydrophobized, and dried so as to cause silica xerogel 14b to fill spaces 14s in non-woven fabric 14a to produce heat insulator 14. The silica xerogel is disposed also on surfaces of heat insulator 14, and hardly allows an adhesive or the like from to be disposed on the surfaces. The entire of heat insulator 14 can be covered with a protective film, and an adhesive can be disposed on the protective film and can be adhered onto exterior can 11. However, this configuration provides heat insulator 14 with a large thickness, or requires a high cost for installation of the protective film.

Figure 2A:
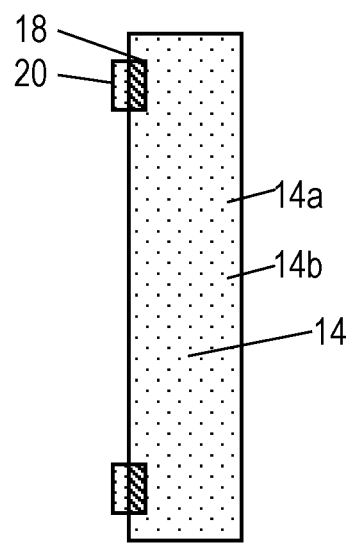
FIG. 2A is a sectional view of the heat insulator of the battery cell in accordance with the embodiment.

FIG. 2A is a sectional view of heat insulator 14 capable of being adhered onto exterior can 11. In heat insulator 14 shown in FIG. 2A, regions having no silica xerogel are formed in a part of one surface of heat insulator 14, and adhesives 20 are disposed in these regions. In order to form the regions having no silica xerogel, thin protective coatings 18 made of the PET or the like are adhered onto, e.g. a part of one surface of non-woven fabric 14a. This configuration may be provided by, e.g. the following method. Non-woven fabric 14a having protective coatings 18 thereon is immersed in a sol which is produced by adding hydrochloric acid to a sodium silicate aqueous solution so as to cause spaces 14s in non-woven fabric 14a to be impregnated with the sol. Non-woven fabric 14a is preferably adhered onto protective coatings 18 by a method, such as heat fusion, in order to immerse non-woven fabric 14a in strong acid, such as hydrochloric acid. This method prevents silica xerogel 14b from entering into protective coatings 18. Therefore, adhesives 20 is disposed on protective coatings 18, and heat insulator 14 is adhered onto exterior can 11 with adhesives 20.

Figure 2B:
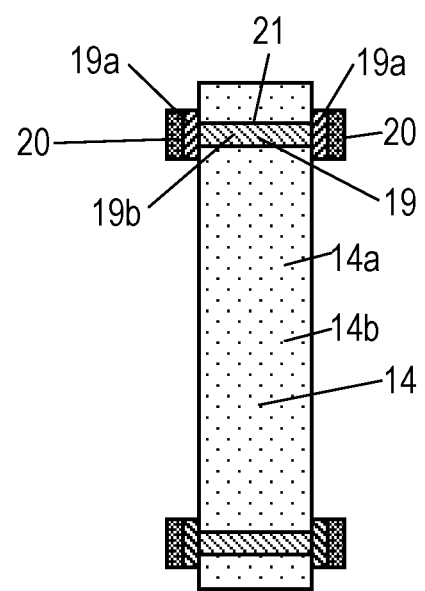
FIG. 2B is a sectional view of another heat insulator in accordance with the embodiment.

FIG. 2B is a sectional view of another heat insulator 14 capable of being adhered onto exterior can 11. In heat insulator 14 shown in FIG. 2B, through-holes 21 is formed in a part of heat insulator 14. Fixing material 19 is provided in the through-hole. Fixing material 19 includes connection rod 19b passing in through-hole 21 and flanges 19a disposed at both ends of connection rod 19b. Flanges 19a are wider than connection rod 19b. Adhesive 20 is disposed on fixing material 19, and heat insulator 14 is adhered onto exterior can 11 with adhesive 20. Fixing material 19 may be made of material onto which silica xerogel 14b hardly adhere and onto which adhesives 20 adhere. Through-hole 21 may be formed after non-woven fabric 14a is impregnated with silica xerogel 14b. Alternatively, through-hole 21 may be formed in non-woven fabric 14a before non-woven fabric 14a is impregnated with silica xerogel 14b. In this case, heat insulator 14 may be obtained by immersing non-woven fabric 14a having through-hole 21 therein in the sol, which is produced by adding hydrochloric acid to a sodium silicate aqueous solution.

Battery cell 13 has an insulation property by thus covering the entire periphery of exterior can 11 with insulative film 15. Furthermore, heat insulator 14 is disposed inside insulative film 15, so that, even when the other battery cell is adjacent to one battery cell, heat is hardly transferred to the other battery cell.

Figure 3:
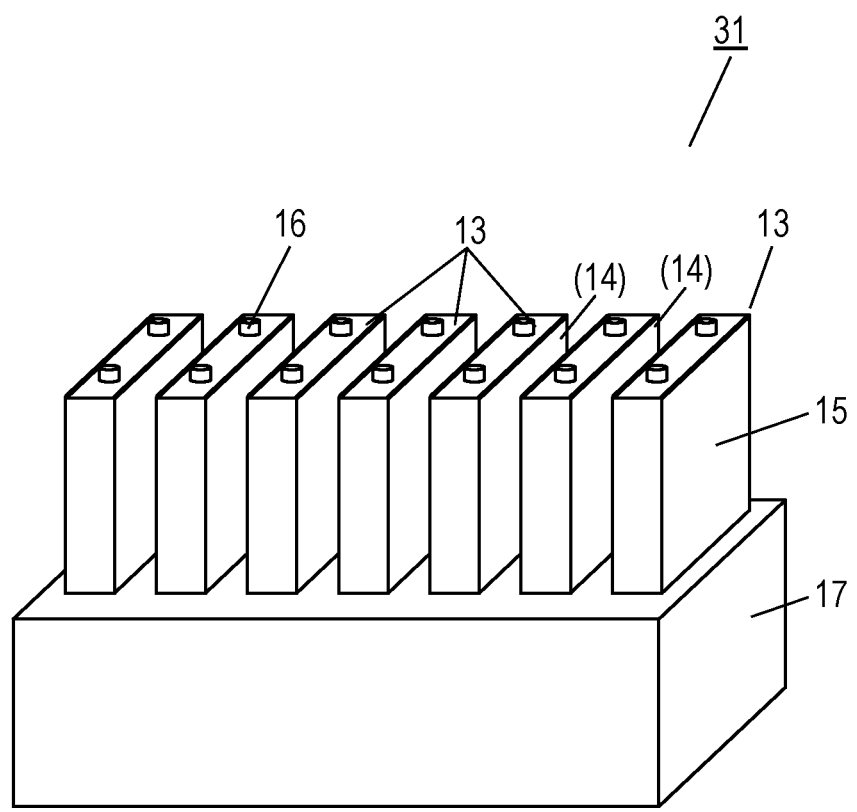
FIG. 3 is an exploded perspective view of a battery pack including the battery cell in accordance with the embodiment.

FIG. 3 is an exploded perspective view of battery pack 31 including plural battery cells 13. Battery cells 13 are arranged in casing 17. In each of battery cells 13, heat insulator 14 is disposed on at least one surface of exterior can 11, as shown in FIG. 1B, and heat insulator 14 and the side surface of exterior can 11 are covered with insulative film 15. Heat insulator 14 is located between battery cells 13.

In the above conventional battery pack, when one battery cell causes a thermal runaway, the battery cell can adversely affect also an adjacent battery cell. Therefore, thermal insulation is required between the battery cells. For this thermal insulation, a spacer is disposed between the battery cells. In order to prevent one battery cell from affecting the adjacent battery cell, the interval between the battery cells is increased, accordingly increases the size of the entire battery pack.

In battery pack 31 according to the embodiment, even when one battery cell 13 among plural battery cells 13 causes a thermal runaway, the one battery cell is prevented from adversely affecting adjacent battery cell 13. Furthermore, heat insulator 14 is provided in each battery cell 13, so that battery pack 31 may be manufactured easily and have a small size.

REFERENCE MARKS IN THE DRAWINGS 11 exterior can
13 battery cell
14 heat insulator
15 insulative film
16 terminal electrode
17 casing
18 protective coating
19 fixing material
20 adhesive
21 through-hole
31 battery pack

The invention claimed is:

1. A battery cell comprising:
    an exterior can including a side wall having a tubular shape and a bottom sealing disposed at an end of the side wall;
    an electrode body accommodated in the exterior can;
    a heat insulator disposed on at least a part of an outer surface of the side wall of the exterior can;
    a protective coating fused with at least a surface of the heat insulator facing the exterior can;
    an adhesive disposed on a part of a surface of the protective coating, the adhesive fixing the heat insulator to the exterior can; and
    an insulative film covering the heat insulator and the exterior can.

2. The battery cell according to claim 1, wherein the insulative film is made of heat shrinkable material shrunk by heat.

3. The battery cell according to claim 1, wherein the heat insulator includes:
    a fiber sheet; and
    silica xerogel with which the fiber sheet is impregnated.

4. The battery cell according to claim 3, wherein the fiber sheet comprises a non-woven fabric made of one of glass fiber, ceramic fiber, oxidized fiber or polyethylene terephthalate.

5. The battery cell according to claim 1, wherein the protective coating is fused with the fiber sheet.

6. The battery cell according to claim 1, wherein a thermal conductivity of the heat insulator is lower than a thermal conductivity of the insulative.

7. The battery cell according to claim 6, wherein a thermal conductivity of the heat insulator ranges from 0.018 W/mK to 0.024 W/mK.

8. A battery pack comprising:
    the battery cell according to claim 1;
    a further battery cell; and a casing accommodating therein the battery cell and the further battery cell, wherein the heat insulator of the battery cell is located between the further battery cell and the battery cell.

9. A battery cell comprising:

an exterior can made of metal including a side wall having a tubular shape having opposite ends and a bottom sealing one of the opposite ends of the side wall;

an electrode body accommodated in the exterior can;

a heat insulator disposed on at least a part of an outer surface of the side wall of the exterior can;

an insulative film covering the heat insulator and an entire of the outer surface of the side wall of the exterior can; and an adhesive disposed on a part of a surface of the heat insulator facing the exterior can, wherein the heat insulator includes:
 a fiber sheet;
 silica xerogel with which the fiber sheet is impregnated; and
 a protective coating provided at the surface of the heat insulator, the heat insulator is fixed to the exterior can via the adhesive, the adhesive is disposed on the protective coating, and the protective coating is fused with the fiber sheet.

10. The battery cell according to claim 9, wherein the insulative film is made of heat shrinkable material shrunk by heat.

11. A battery pack comprising:

the battery cell according to claim 9;

a further battery cell; and a casing accommodating therein the battery cell and the further battery cell, wherein the heat insulator of the battery cell is located between the further battery cell and the battery cell.

12. The battery cell according to claim 9, wherein the fiber sheet comprises a non-woven fabric made of one of glass fiber, ceramic fiber, oxidized fiber or polyethylene terephthalate.

13. The battery cell according to claim 9, wherein a thermal conductivity of the heat insulator is lower than a thermal conductivity of the insulative film.

14. The battery cell according to claim 13, wherein a thermal conductivity of the heat insulator ranges from 0.018 W/mK to 0.024 W/mK.

* * * * *